(12) United States Patent  (10) Patent No.: US 7,706,097 B2
Kuroki et al.  (45) Date of Patent: Apr. 27, 2010

(54) MAGNETIC DISK DRIVE WITH HEAD RETRACTION CONTROL

(75) Inventors: Kenji Kuroki, Kanagawa (JP); Toru Aida, Kanagawa (JP); Kenichi Kuramoto, Kanagawa (JP); Yasuhiro Kotani, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/284,231

(22) Filed: Sep. 19, 2008

(65) Prior Publication Data

US 2009/0034114 A1  Feb. 5, 2009

Related U.S. Application Data

(63) Continuation of application No. 11/583,211, filed on Oct. 18, 2006, now Pat. No. 7,428,119.

(30) Foreign Application Priority Data

Oct. 19, 2005  (JP) .............................. 2005-303899

(51) Int. Cl.
*G11B 21/02* (2006.01)
(52) U.S. Cl. ....................................................... 360/75
(58) Field of Classification Search .................. 360/75, 360/69, 31, 60
See application file for complete search history.

(56) References Cited

U.S. PATENT DOCUMENTS

| RE35,269 E | 6/1996 | Comerford |
| 5,777,815 A | 7/1998 | Kasiraj et al. |
| 6,109,101 A | 8/2000 | Iwabuchi et al. |
| 6,520,013 B1 * | 2/2003 | Wehrenberg ................. 73/489 |
| 6,754,027 B2 | 6/2004 | Hirano et al. |
| 6,768,066 B2 * | 7/2004 | Wehrenberg ............. 200/61.49 |
| 6,771,449 B1 | 8/2004 | Ito et al. |
| 6,975,476 B1 | 12/2005 | Berding |

(Continued)

FOREIGN PATENT DOCUMENTS

JP  2002-100180  4/2002

(Continued)

OTHER PUBLICATIONS

Office Action for U.S. Appl. No. 11/583,211, dated Nov. 26, 2007.

(Continued)

*Primary Examiner*—Fred Tzeng
(74) *Attorney, Agent, or Firm*—Townsend and Townsend and Crew LLP; John Henkaus

(57) ABSTRACT

Embodiments of the invention improve utility of a magnetic disk drive in which a head is retracted if the magnetic disk drive is in a dropping state. In one embodiment, an HDC/MPU provided in a magnetic disk drive judges whether the magnetic disk drive is in a dropping state based on an output from an acceleration sensor which may detect an acceleration and performs a retraction operation of a head. After the HDC/MPU judges that a drop is occurring, the HDC/MPU detects whether the drop judgment is incorrect according to whether a shock sensor detects a shock occurrence and changes the drop judgment condition based on a detection history of detected incorrect judgments.

16 Claims, 5 Drawing Sheets

U.S. PATENT DOCUMENTS

| | | |
|---|---|---|
| 6,995,939 B2 | 2/2006 | Ito et al. |
| 7,042,663 B2 * | 5/2006 | Shimotono et al. ............ 360/31 |
| 7,142,385 B2 * | 11/2006 | Shimotono et al. ............ 360/60 |
| 7,154,692 B2 | 12/2006 | Ogawa et al. |
| 7,190,540 B2 | 3/2007 | Matsumoto |
| 7,222,535 B2 | 5/2007 | Shoji |
| 7,307,228 B2 * | 12/2007 | Wehrenberg ............. 200/61.49 |
| 7,351,925 B2 * | 4/2008 | Wehrenberg .......... 200/61.45 R |
| 2002/0002773 A1 | 1/2002 | Satoh et al. |
| 2003/0067705 A1 | 4/2003 | Ishiyama et al. |
| 2004/0125493 A1 | 7/2004 | Shimotono et al. |
| 2006/0139807 A1 | 6/2006 | Shimotono et al. |
| 2008/0156622 A1 * | 7/2008 | Wehrenberg ............. 200/61.49 |
| 2009/0031803 A1 * | 2/2009 | Noda et al. .................... 73/488 |

FOREIGN PATENT DOCUMENTS

| | | |
|---|---|---|
| JP | 2004-146036 | 5/2004 |

OTHER PUBLICATIONS

Notice of Allowability for U.S. Appl. No. 11/583,211, dated May 22, 2008.

* cited by examiner

MAGNETIC DISK DRIVE WITH HEAD RETRACTION CONTROL

CROSS-REFERENCES TO RELATED APPLICATIONS

This application claims priority from Japanese Patent Application No. JP2005-303899, filed Oct. 19, 2005, the entire disclosure of which is incorporated herein by reference.

BACKGROUND OF THE INVENTION

The present invention relates to a magnetic disk drive. More particularly, the present invention relates to a magnetic disk drive in which a head is retracted if the magnetic disk drive is dropping.

A portable electronic apparatus is subject to shocks due to an accidental drop to the ground, etc. In the case of a portable electronic apparatus provided with a magnetic disk drive, it is a major challenge to protect the portable electronic apparatus from such shocks. In magnetic disk drives, data is written to and read from a rotating magnetic disk by a head which floats above the magnetic disk. Thus, if a portable electronic apparatus provided with a magnetic disk drive is dropped during operation, shocks due to the drop may cause the magnetic disk to be damaged due to collision of the head with the magnetic disk.

According to a known protection mechanism to prevent a magnetic disk from being damaged as mentioned above, if a magnetic disk drive or an electronic apparatus with a magnetic disk drive incorporated detects that the magnetic disk drive or the electronic apparatus is dropping, the head is retracted to a safe place so as to avoid contact with the magnetic disk. Such a protection mechanism is disclosed in, for example, Patent Documents 1 through 3.

Disclosed in Patent Document 1 (Japanese Patent Laid-Open No. 2002-100180) is a magnetic disk drive which is provided with a 2-axis acceleration sensor having two detection axes (X and Y axes). This magnetic disk drive detects a dynamic acceleration (shock) and a static acceleration (change in gravity or tilt) from the output signals of the 2-axis acceleration sensor. Further, these detection signals are entered into a CPU in the magnetic disk drive to determine whether or not the magnetic disk drive is dropping. If the magnetic disk drive is dropping, the head is retracted to a ramp position.

Disclosed in Patent Document 2 (Japanese Patent Laid-Open No. 2004-146036) is a protection mechanism to protect a magnetic disk drive from landing shock. This protection mechanism recognizes the state of a magnetic disk drive or an electronic apparatus with a magnetic disk drive incorporated, such as a notebook PC, by analyzing the outputs of a 2-axis or 3-axis acceleration sensor mounted outside or inside the magnetic disk drive. Based on the result of analysis, the protection mechanism predicts whether or not the magnetic disk drive will have a shock such as a landing shock. If a shock is predicted to occur, the head is retracted. In addition, the protection mechanism disclosed in Patent Document 2 includes such control as to change the sensitivity for predicting a shock. Namely, if the dynamic situation of the magnetic disk drive is within a certain range for a certain period of time, it is not judged that the magnetic disk is dropping. Further, the protection mechanism disclosed in Patent Document 2 changes the condition for determining to return the retracted magnetic head according to the dynamic situation of the magnetic disk drive before a shock is predicted.

In Patent Document 3 (Japanese Patent Laid-Open No. 2003-263240), an electronic apparatus is disclosed which uses a gravity sensor composed of a mechanical switch which is open in zero gravity state. Based on the output signal of the gravity sensor, the electronic apparatus judges whether it is dropping. If so, the electronic apparatus executes an anti-shock countermeasure such as retracting of the head.

To protect the magnetic disk from a landing shock, it is necessary to promptly retract the head before the landing shock occurs. Thus, to improve the availability of the magnetic disk drive, it is desirable to minimize the time spent to retract the head to the ramp position after it is detected that the magnetic disk drive is dropping. In the above-mentioned Patent Documents 1 through 3, any specific operation to promptly retract the head upon detection of a fall is not disclosed although retraction of the head to the ramp position is disclosed.

Another problem is that giving higher priority to protection from landing shock makes it more likely to judge that the magnetic disk drive is dropping even when it is actually not dropping, that is, increases incorrect detections each of which causes a retraction of the head. Since it is not possible to access the magnetic disk while the head is retracted, increased incorrect detections deteriorate the performance of the magnetic disk drive. Thus, to improve the availability of the magnetic disk drive, it is desirable to suppress incorrect detections. The sensitivity for predicting a shock, namely the condition for judging whether the magnetic disk drive is dropping may be changed according to the dynamic situation of the magnetic disk drive as disclosed in Patent Document 2. In Patent Documents 1 through 3, however, nothing is disclosed as to what action is to be taken concerning the prediction when drop detection is found incorrect.

Further, if the head is retracted to the ramp position due to incorrect drop detection and kept there for a long period of time, the performance of the magnetic disk drive deteriorates since the magnetic disk cannot be accessed. Thus, to improve the availability of the magnetic disk drive, it is desirable to immediately cancel the head retraction and return the head to the magnetic disk if the drop detection is found incorrect. As disclosed in Patent Document 2, the condition for determining to return the head, namely the acceptable value for the dynamic situation of the magnetic disk drive which permits the head to be returned, may be changed adaptively based on the history of the dynamic situation of the magnetic disk drive. However, any of Patent Documents 1 through 3 does not disclose a specific operation to promptly return the head when the drop detection is found incorrect.

BRIEF SUMMARY OF THE INVENTION

Taking the above-mentioned situation into consideration, the present invention was made to improve the availability of a magnetic disk drive which retracts a head if the magnetic disk drive is dropping. More specifically, the present invention provides a magnetic disk drive capable of suppressing incorrect drop detections. The present invention also provides a magnetic disk drive capable of promptly returning a head if the drop detection is found incorrect. Furthermore, the present invention provides a magnetic disk drive capable of reducing the time spent to retract a head to the ramp position after it is detected that the magnetic disk drive is dropping.

According to a first aspect of the present invention, a magnetic disk drive comprises: a magnetic disk; a head which accesses the magnetic disk; a sensor section capable of detecting acceleration; a first judgment section which judges whether a drop occurs based on an output of the sensor section; a processing section which executes retraction of the head if the first judgment section judges that a drop is occurring; and a second judgment section which detects the occurrence of a shock based on the output of the sensor section. The processing section detects an incorrect drop judgment according to whether the occurrence of a shock is detected by the second judgment section after it is judged that a drop is occurring by the first judgment section, and changes the drop judgment condition of the first judgment section based on the history of detected incorrect judgments.

This configuration enables the drop judgment to be accurate since the drop judgment condition may be set appropriately so as to reduce incorrect drop judgments. Thus, it is possible to improve the magnetic disk device in access performance and availability since the unnecessary retraction time of the head may by reduced by decreasing incorrect judgments.

The sensor section may be configured by using a gravity sensor which generates a detection signal by detecting a zero gravity state and a shock sensor which detects a change in acceleration due to a landing shock. In this case, the first judgment section judges whether a drop is occurring based on the detection signal of the shock sensor, and the second judgment section judges whether a shock is occurring based on the detection signal of the gravity sensor.

The above-mentioned magnetic disk drive according to the first aspect of the present invention may be configured in such a manner that if the number of incorrect drop judgments exceeds a predetermined number, the processing section changes the judgment condition of the first judgment section so as to more stringently make a drop judgment. This may reduce incorrect drop judgments.

In addition, the above-mentioned magnetic disk drive according to the first aspect of the present invention may be configured in such a manner that the judgment condition is changed by shifting the timing at which a drop judgment is made after a change in the output signal of the sensor section is detected by the first judgment section. This may reduce incorrect drop judgments since accurate judgment is made possible.

In addition, the above-mentioned magnetic disk drive according to the first aspect of the present invention may be configured in such a manner that the first judgment section makes a drop judgment by comparing a threshold with the acceleration detected by the sensor section, and the judgment condition is changed by modifying the threshold. This may reduce incorrect drop judgments since accurate judgment is made possible.

According to a second aspect of the present invention, a magnetic disk drive comprises: a magnetic disk; a head which accesses the magnetic disk; a sensor section capable of detecting acceleration; a first judgment section which judges whether a drop is occurring based on the output of the sensor section; a processing section which executes retraction of the head if the first judgment section judges whether a drop is occurring; and a second judgment section which detects the occurrence of a shock based on the output of the sensor section. The processing section performs re-loading of the head if the affirmative drop judgment by the first judgment section is cancelled after the head begins to be retracted, or if no shock is detected by the second judgment section after the affirmative drop judgment is cancelled.

In this configuration, if no shock is detected even when the magnetic disk drive is no longer dropping, the head may promptly be re-loaded by recognizing that the drop judgment is incorrect. Thus, the magnetic disk drive may be improved in availability since it is possible to reduce the amount of time for which access to the magnetic disk is inhibited due to the retracted head.

The above-mentioned magnetic disk drive according to the second aspect may be configured in such a manner that the processing section performs re-loading of the head when a first predetermined amount of time has passed with no shock detected by the second judgment after the affirmative drop judgment made by the judgment section 1 is cancelled.

Further, if a shock is detected by the second judgment section after the head begins to be retracted, the processing section may perform re-loading of the head when a second predetermined amount of time has passed. This may change the timing of re-loading of the head depending on whether the drop judgment is incorrect. Preferably, the first predetermined amount of time is shorter than the second predetermined amount of time. Thus, it is possible to promptly re-load the head if the drop judgment is incorrect while sufficiently postponing the re-loading if a shock is actually detected.

In addition, the above-mentioned magnetic disk drive according to the second aspect may be configured in such a manner that if the affirmative drop judgment by the first judgment section is cancelled after the head begins to be retracted, the processing section performs re-loading of the head if no shock is detected by the second judgment section within a predetermined period of time which includes the point of time when the affirmative drop judgment is cancelled.

The above-mentioned magnetic disk drive according to the second aspect may also be configured in such a manner that if a shock is detected by the second judgment section after the head begins to be retracted, the processing section performs re-loading of the head when the second predetermined amount of time has passed after the shock detection by the second judgment section is cancelled. The start point of time of the second predetermined amount of time corresponds to a protection time period which is imposed until the re-loading is permitted is set to the point of time when the magnitude of a series of shocks falls to a low level, even if the series of shocks continuously act on the magnetic disk drive due to bounces or the like after a drop.

Further, if a new shock is detected by the second judgment section before the second predetermined amount of time elapses, the processing section may perform re-loading of the head when the second predetermined amount time has passed after the new shock detection by the second judgment section is cancelled. It is therefore possible to protect the magnetic disk drive from shocks caused by its exceptional behavior after being dropped since the head re-loading timing may be set again if a shock is detected while the head is retracted.

In the above-mentioned magnetic disk drive according to the second aspect, in the case where a shock is detected by the second judgment section and the shock detection is cancelled, and the case where no shock is detected by the second judgment section and an affirmative drop judgment made by the first judgment section is cancelled, the time from the cancellation to the re-loading of the head may vary depending on the above cases using the processing section.

According to a third aspect of the present invention, a magnetic disk drive comprises: a magnetic disk; a head which accesses the magnetic disk; a sensor section capable of detecting acceleration; and a processing section which judges whether a drop is occurring based on the output of the sensor section and executes retraction of the head. For retraction of the head, the processing section executes retraction of the head in such a manner that at least until the head reaches the periphery of the magnetic disk, the head position continues to be detected based on servo data recorded on the magnetic disk and the head seek speed continues to be controlled by using the detected head position.

With this configuration, the head position signal may be detected after it is judged a drop is occurring. As a result, the head speed may be changed appropriately based on the distance from the current head position, the current head speed and the distance from the current head position to the periphery of the magnetic disk. It is therefore possible to retract the head more quickly than a constant-speed head retraction mechanism which does not change the head speed at any position. Thus, it is possible to reduce the possibility of damaging the magnetic disk due to a landing shock since the head may be retracted more promptly. This improves the availability of the magnetic disk drive.

It is preferable that the processing section continue to control the head seek speed based on the servo data until the head reaches a non-data area on the magnetic disk. As long as the head position may be obtained, the average speed of the head, including the speed for a period of time to the completion of the head retraction operation, may be increased by performing the retraction operation with speed control, resulting in reduction of the time required for the completion of the head retraction operation.

Further, the processing section may drive the actuator so as to move the head at a constant speed from the periphery of the magnetic disk to a head retraction place. This makes it possible to reliably complete the retraction of the head.

The actuator may be provided with a voice coil motor which generates a driving force to move the head. In this case, the processing section may drive the actuator in such a manner that the back electromotive force of the voice coil motor falls within a predetermined range when the head is retracted from the periphery of the magnetic disk to the head retraction place. This makes it possible to reliably complete the retraction of the head.

In addition, the processing section may retract the head from the periphery of the magnetic disk to the head retraction place by supplying a predetermined drive voltage or current to the actuator which makes the head move. This may simplify the retraction process after the head is moved to the periphery of the magnetic disk.

The predetermined drive voltage or drive current to be supplied to the actuator may be a pulse voltage or pulse current each having one or plural pulses.

According to the present invention, it is possible to improve the availability of a magnetic disk drive in which a head is retracted if the magnetic disk drive is dropping.

DETAILED DESCRIPTION OF THE INVENTION

Figure 1:
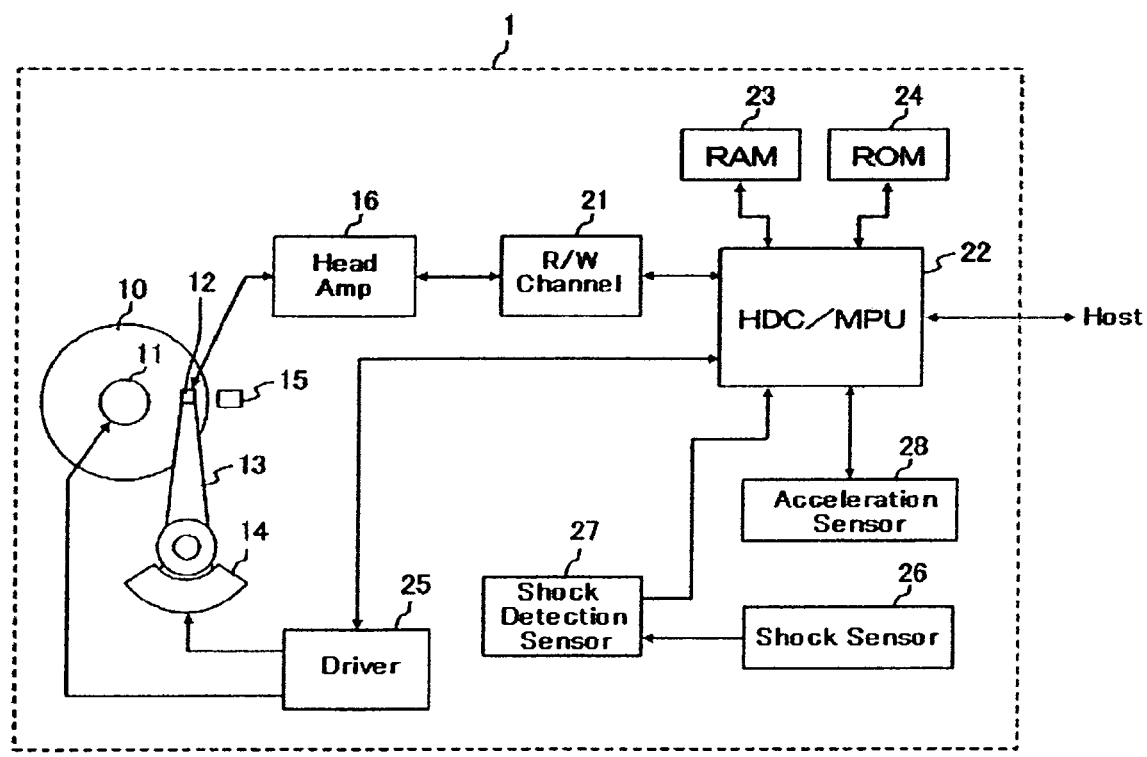
FIG. 1 shows the configuration of a magnetic disk drive according to an embodiment of the present invention.

Specific embodiments of the present invention will be described below with reference to the drawings. In each drawing, the elements which are the same are indicated by the same reference numerals, and duplicate descriptions are omitted for the purpose of clarity. The embodiment described below is a magnetic disk drive to which the present invention is applied.

Embodiment 1

FIG. 1 shows a configuration of a magnetic disk drive 1 according to an embodiment of the present invention. In FIG. 1, the magnetic disk drive 1 has a magnetic disk 10 as a recording medium to record data. The magnetic disk 10 is a non-volatile memory whose magnetic layer is magnetized to record data. The magnetic layer 10 is fixed to the hub of a SPM 11. The SPM 11 drives the magnetic disk 10 to rotate at a predetermined speed.

A head 12 has a write element by which an electrical signal is converted to a magnetic field according to data recorded onto the magnetic disk 10 and a read element by which a magnetic field from the magnetic disk 10 is converted to an electrical signal. The head 12 is held by a front end of a carriage 13. To describe in more detail, the head 12 is held by a suspension (not shown in the figure) which extends to the front end of the carriage 13 fixed to a voice coil motor (VCM) 14.

The carriage 13 is fixed to the voice coil motor (VCM) 14. The VCM 14 is an actuator mechanism to move the head 12 to any track on the magnetic disk 10.

The magnetic disk drive 1 according to the embodiment employs a ramp load system. When the rotation of the magnetic disk stops to switch to an inactive state, the magnetic disk drive 1 retracts the head 12 from the recording surface of the magnetic disk 10. The retracted head moves onto a ramp 15 and stops there. The ramp 15 is located near the magnetic disk 10. In more detail, a tab (not shown) moves onto the guide surface (slope surface) and stops there. This tab is formed at the front end of the suspension which includes the carriage 13 and holds the head 12. The action to retract a head from a magnetic disk in a magnetic disk drive employing such a ramp load system is called unload. On the other hand, the action to move the head from the ramp to the magnetic disk is called load.

A head amp 16 comprises a read amp and a write driver. The read amp amplifies a read signal retrieved from the magnetic disk 10 and outputs them to an R/W channel 21 described below. The write driver amplifies a write signal from the R/W channel 21 for recording to the magnetic disk 10.

The R/W channel 21 performs modulation processing, serial-parallel conversion processing and the like for write data recorded onto the magnetic disk 10 and sends the resulting write signal to the head amp 16. Also, the R/W channel 21 performs demodulation processing for a read signal retrieved by the head 12 from the magnetic disk 10 and outputs the restored data to an HDC/MPU 22.

The HDC/MPU 22 is a processor which controls the entire magnetic disk drive 1, including control of the position of the head 12, permission of writing/reading of data for the R/W channel 21, control of the interface with an external host, and management of failures. In addition, the HDC/MPU 22 in the embodiment receives an output of an acceleration sensor 28 and executes a process to unload the head 12 if it is detected that the magnetic disk drive 1 is dropping. Further, based on an output of the acceleration sensor 28 which detects a dropping state and an output of a shock sensor 26 which detects the occurrence of a landing shock, the HDC/MPU 22 may adaptively change the condition for judging whether the magnetic disk drive 1 is dropping. Further, after the head is unloaded upon detection of a dropping state, the HDC/MPU 22 determines the timing of permitting the reload of the head after the magnetic disk drive 1 is found no longer to be in a dropping state. These processes will be described later in detail.

A RAM 23 is used as a work area where the HDC/MPU 22 performs processing. A ROM 24 is a non-volatile memory which stores firmware programs or the like to implement the control according to the present embodiment.

A motor driver 25 drives the SPM 11 and the VCM 14 according to the control signal from the HDC/MPU 22.

The shock sensor 26 is a sensor to detect such mechanical shocks which are added to the magnetic disk drive 1 due to a drop to the ground, etc. To detect the change in acceleration, the shock sensor 26 outputs a voltage signal proportional to the acceleration. A shock detection circuit 27 is a comparator circuit which extracts a frequency band corresponding to a shock from the output signal of the shock sensor 26 and judges whether the magnitude of the shock is larger than a predetermined level. In addition, the shock detection circuit 27 outputs a judgment result to the HDC/MPU 22. The shock detection circuit 27, for example, may output the judgment result as a binary logical signal. Specifically, a shock threshold may be set to 10 G. In this case, if the output signal of the shock sensor 26 indicates a shock of 10 G or higher, "High" may be output to the HDC/MPU 22. Likewise, "Low" may be output if the indicated shock is lower than 10 G.

Figure 2:
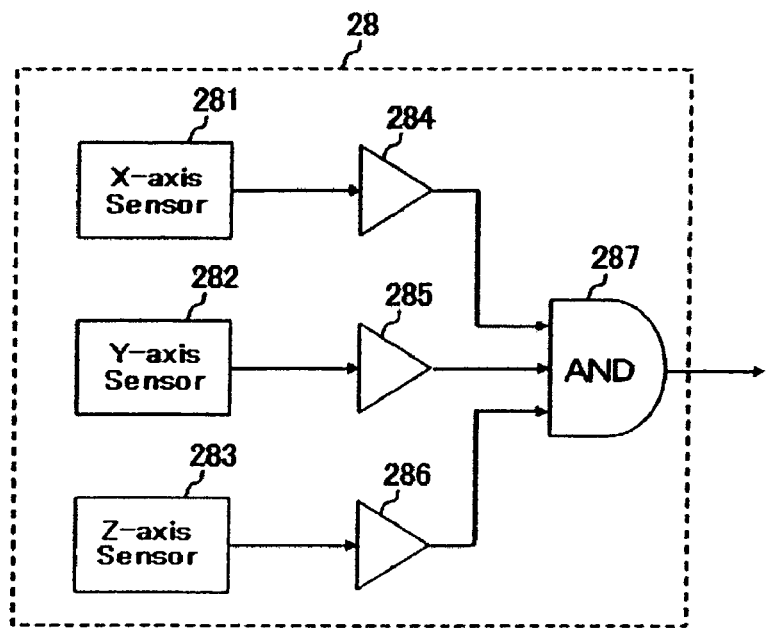
FIG. 2 shows the configuration of an acceleration sensor provided in the magnetic disk drive of the present invention.

The acceleration sensor 28 may detect the change of acceleration in magnitude and direction. FIG. 2 shows a specific example of a configuration of the acceleration sensor 28. The acceleration sensor 28 shown in FIG. 2 detects accelerations in three directions. Comparing each of absolute values of the detected accelerations in three directions with a threshold, the acceleration sensor 28 outputs a drop detection signal if the detected acceleration values in the three directions all exceed the threshold. For example, a voltage corresponding to any one of the values between 0.2 G and 0.5 G is set as the threshold and the drop detection signal is output if the acceleration values in each of the three directions are above the threshold. Here, 1 G corresponds to the acceleration of gravity (about 9.8 m/cm2). With consideration of a centrifugal force caused by rotation during dropping and a zero G offset in a sensor, it is desirable to set the threshold to a finite value between 0.2 G and 0.5 G as mentioned above, instead of using a threshold corresponding to zero G.

In FIG. 2, an X-axis sensor 281, a Y-axis sensor 282 and a Z-axis sensor 283 are sensors which detect the magnitudes of accelerations along three mutually orthogonal axes (X, Y and Z axes). The X-axis sensor 281 outputs a voltage proportional to the detected acceleration to a comparator 284. Also, the Y-axis sensor 282 and Z-axis sensor 283 output voltages proportional to the detected accelerations to comparators 285 and 286, respectively. The comparators 284 through 286 respectively compare the output voltages of the X-axis sensor 281, Y-axis sensor 282, and Z-axis sensor 283 with a threshold voltage which corresponds to an acceleration magnitude of, for example, 0.4 G. If the output voltage of a sensor is not higher than the threshold voltage, that is, the acceleration magnitude is not larger than 0.4 G, the comparator outputs "High". On the other hand, if the acceleration magnitude is larger than 0.4 G, "Low" is output. An AND circuit 287 outputs the logical product of the outputs of the comparators 284 through 286.

The following provides a description of the relation between the dynamic situation of the magnetic disk drive 1 and the acceleration detected by the acceleration sensor 28. Various types of acceleration sensors are commercially available. As an example, an acceleration sensor manufactured using MEMS (Micro Electro Mechanical System) technologies is described. Such an acceleration sensor comprises a board having a base section, a weight which is deflectable toward the base section and 4 beams to connect the weight and the base section. The beams have piezoresistors provided thereon where stress concentrates when the weight is deflected toward the base section. The output of the acceleration sensor with such a structure represents the relative acceleration of the weight viewed from the base section.

If the acceleration sensor 28 is an acceleration sensor manufactured using MEMS technologies as mentioned above, its X-axis sensor, Y-axis sensor and Z-axis sensor respectively detect accelerations of 0 G, 0 G and 1 G when the magnetic disk drive 1 remains stationary on a table parallel to the XY plane including the X and Y axes of the acceleration sensor 28. To simplify the description, an ideal condition is assumed here by ignoring detection errors including 0 G offset.

If the magnetic disk drive 1 is dropping, each of the X-axis sensor 281, Y-axis sensor 282 and Z-axis sensor 283 detects an acceleration of 0 G. This is because since a constant gravity acceleration acts on both of the aforementioned base section and weight, the relative acceleration is 0 G along any of the three axes.

Therefore, the AND circuit 287 may be designed to output a binary drop detection signal which is asserted to a High level when the acceleration magnitude in any of the three directions is smaller than a predetermined threshold (for example, 0.4 G). On the other hand, the drop detection signal is de-asserted to a Low level if not.

Since the drop detection is performed by using the comparators and the logic circuit of the acceleration sensor 28 as mentioned above, the HDC/MPU 22 may easily judge whether the magnetic disk drive 28 is dropping based on the duration time of the drop detection signal asserted by the acceleration sensor 28. This configuration enables prompt drop judgment by the HDC/MPU 22 since the amount of processing the HDC/MPU 22 needs to perform may be reduced. Alternatively, if the HDC/MPU 22 has sufficient processing capability, the three directional accelerations detected by the acceleration sensor 28 may be output to the HDC/MPU 22. In this case, the HDC/MPU 22 may recognize that the magnetic disk drive 1 is tilted or rotated by detecting changes in the three directional accelerations.

The configuration of the acceleration sensor 28 shown in FIG. 2 is an example. A dropping state may be detected by detecting changes merely in static acceleration. For example, the sensor may be a gravity sensor comprising a mechanical switch which is open in zero gravity state. Also, instead of judgment based on a logical circuit such as the comparators and the AND circuit as described above, the square root of the sum of squares of the outputs of three directional acceleration sensors may be calculated. In this case, if the calculation result is approximately zero, it is judged that the magnetic disk drive 1 is dropping. This calculation and judgment may be performed by the HDC/MPU 22 if appropriate. Further, the shock sensor 26 and the acceleration sensor 28 may be configured as a single sensor. In this case, the change in acceleration due to a shock and the change in acceleration due to a drop are separately and individually detected by utilizing a difference between their frequency bands.

The aforementioned acceleration sensor 28 detects a dropping state when the magnetic disk drive 1 is in the air, including the case where the sensor 28 is thrown in an upward or horizontal direction. In the case where the acceleration sensor 28 is a two-axis or three-axis acceleration sensor, such a dropping state may also be detected from a change in the acceleration detected by the acceleration sensor 28. This makes it possible to more quickly judge that the magnetic disk drive 1 is dropping since the dropping state may be detected upon the start of the drop.

Figure 3:
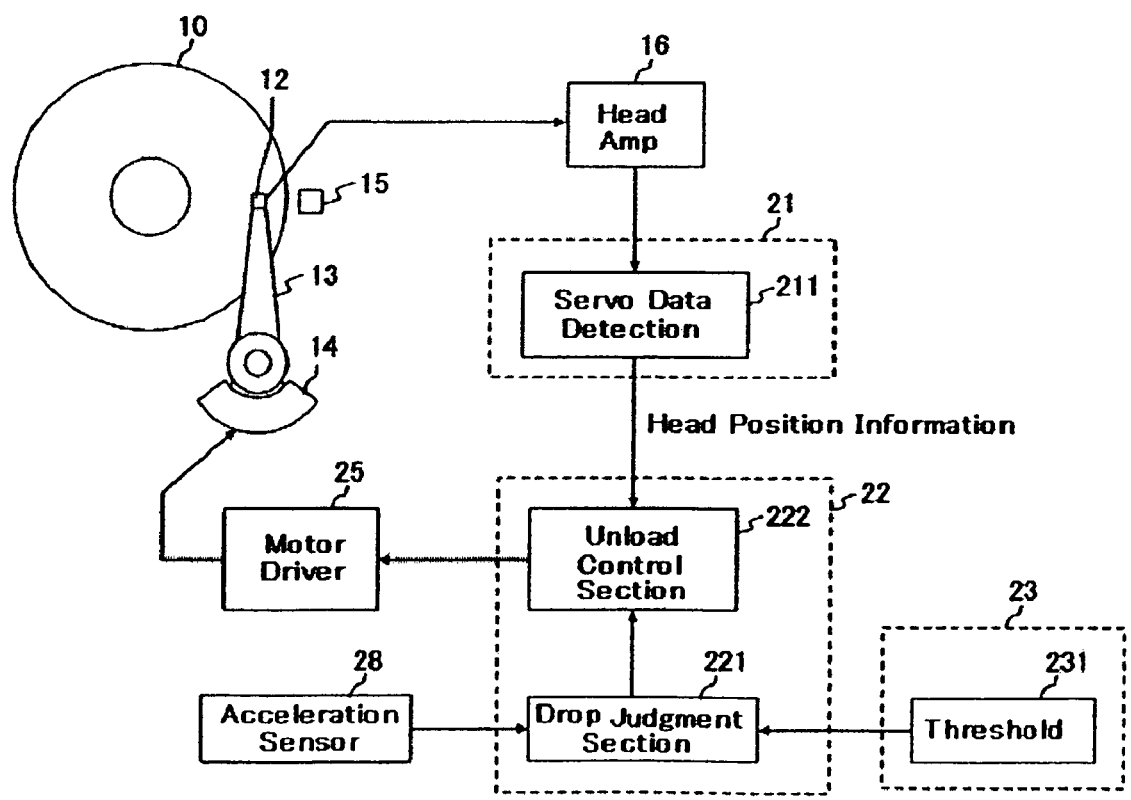
FIG. 3 exemplary shows the configuration of the main parts of the magnetic disk drive according to an embodiment of the present invention.

If the HDC/MPU 22 judges that the magnetic disk drive is dropping, an unload process is executed by the HDC/MPU 22. By using FIG. 3, this unload process is described below. FIG. 3 shows the configuration of a main part of the magnetic disk drive 1 which concerns the head retract process. A drop judgment section 221 of the HDC/MPU 22 periodically (for example, once every 2 ms) samples the drop detection signal output from the acceleration sensor 28 and compares the number of successive detections with a threshold 231 stored in the RAM 23. For example, in the case where the threshold 231 is 10, if the acceleration sensor 28 detects a drop state 10 times (e.g., for 20 ms) in succession with the drop detection signal, the drop judgment section 221 judges that the magnetic disk drive 1 is in a dropping state. Upon the judgment, the drop judgment section 221 instructs the unload control section 222 to unload the head 12.

The unload control section 222 executes an unload operation through the following procedure. First, until the head 12 reaches the periphery of the magnetic disk 10, the head 12 is moved by performing the same control as the positioning control of the head 12 upon data read/write operation from/to the magnetic disk 10 (hereinafter, seek control). Specifically, data read out from the magnetic disk 10 by the read element of the head 12 is output to a servo data detection section 211 of the R/W channel 21. The servo detection section 211 obtains head position information from the servo data and outputs the head position information to the unload control section 222. Here, the periphery of the magnetic disk 10 is a non-data area where user data is not recorded although servo data is recorded. Also, servo data is address information indicating the location on the magnetic disk and is written on the magnetic disk. Head position information comprises track number information, sector number information, and relative position information for the head relative to the center of the magnetic disk. The unload control section 222 obtains the current head position and speed based on the head position information, determines the amount of current to be applied to the VCM 14 and notifies the motor driver 25 of it.

The above-mentioned process performed by the drop judgment section 221 and unload control section 222 may be realized by executing firmware programs stored in the ROM 24 through the HDC/MPU 22 and controlling the R/W channel 21, the motor driver 25, the acceleration sensor 28 and the like, as well as processing performed by the HDC/MPU 22.

In the case where a head is unloaded in a conventional magnetic disk drive, the head is unloaded to the ramp position by controlling the carriage to pivot at a constant speed. This is done by monitoring the back electromotive force of the VCM which is proportional to the head moving speed. Typically, the carriage is stopped on the ramp by limiting the carriage's range of movement using a crash stop. If the head speed is too high during the unload operation, the head may be damaged or bounced by the crash stop resulting in a drop onto the magnetic disk. In addition, In the conventional unload operation, the head position cannot be detected during the unload operation. Thus, whenever the head is unloaded from any position on the magnetic disk, the head speed during the unload operation is limited in order to prevent the head from being damaged and bounced by the crash stop. This ensures that the head may be unloaded safely from any position.

Conventionally, the head is also retracted from the magnetic disk if power supply to the magnetic disk drive is interrupted (hereinafter, called the retract process). To unload the head by pivoting the carriage, the retract process supplies a current to the VCM by using the back electromotive force of the SPM or a capacitor as a voltage source. In the case of the retract process, the head position signal cannot be detected since power is off and the magnetic disk is being stopped. Thus, the head is retracted to the ramp position at a higher speed than that in the normal unload operation so that the head is surely retracted to the ramp from any position. This operation is likely to damage the head and deteriorate the reliability of the magnetic disk drive.

By contrast, the present embodiment continues to detect the head position and control the moving speed of the head until the head 12 reaches the periphery of the magnetic disk 10. This operation allows the head speed to be appropriately controlled. For example, in the case where the head 12 exists in an inner area of the magnetic disk 10, by setting the head speed to a high speed for a period of time until the head reaches the periphery, the unload operation may be completed faster than the conventional unload mechanism which moves the head at a constant speed. In addition, unlike the retract process, the unload operation of the present embodiment does not cause deterioration in reliability since the head speed is controllable.

The periphery of the magnetic disk 10 serves as a boundary for the head 12 unloaded by the above-mentioned seek control. This periphery may be the outermost track where servo data is recorded. Since the head speed may be controlled until the positioning control of the head 12 becomes impossible, the average head speed including the speed for a period of time to the completion of the unload operation may be increased. This contributes to the reduction of the time required to complete the unload operation.

If a failure of the detection the head position occurs while the above-mentioned unload operation of the present embodiment is ongoing, a conventional unload operation may be performed. For example, the head may be unloaded at a constant speed by monitoring the back electromotive force of the VCM. Also, a control variable determined based on the last head position may be given to the motor driver 25 which drives the VCM 14 to perform the unload operation.

After the head 12 is moved to the periphery of the magnetic disk 10 by the aforementioned unload operation of the present embodiment, the head may be retracted to the ramp 15 at a constant speed by monitoring the back electromotive force of the VCM 14 in the same manner as the conventional unload operation. This may surely complete the retraction of the head 12.

After the head 12 is moved to the periphery of the magnetic disk 12, the retraction to the ramp 15 may also be done by supplying a predetermined current to the VCM 14 without performing the constant speed control which is performed by monitoring the back electromotive force of the VCM 14. By taking into consideration the distance from the periphery of the magnetic disk 10 to the ramp 15, the energy required for the carriage 13 to be placed onto the ramp 15 and the like, the amount of current to be supplied may be determined so that the carriage 13 collides with the crash stop at an appropriate speed. This may simplify the unload operation since the constant speed control is not necessary. The predetermined amount of current to be supplied to the VCM 14 may be either a constant current or one or more pulse currents.

Figure 4:
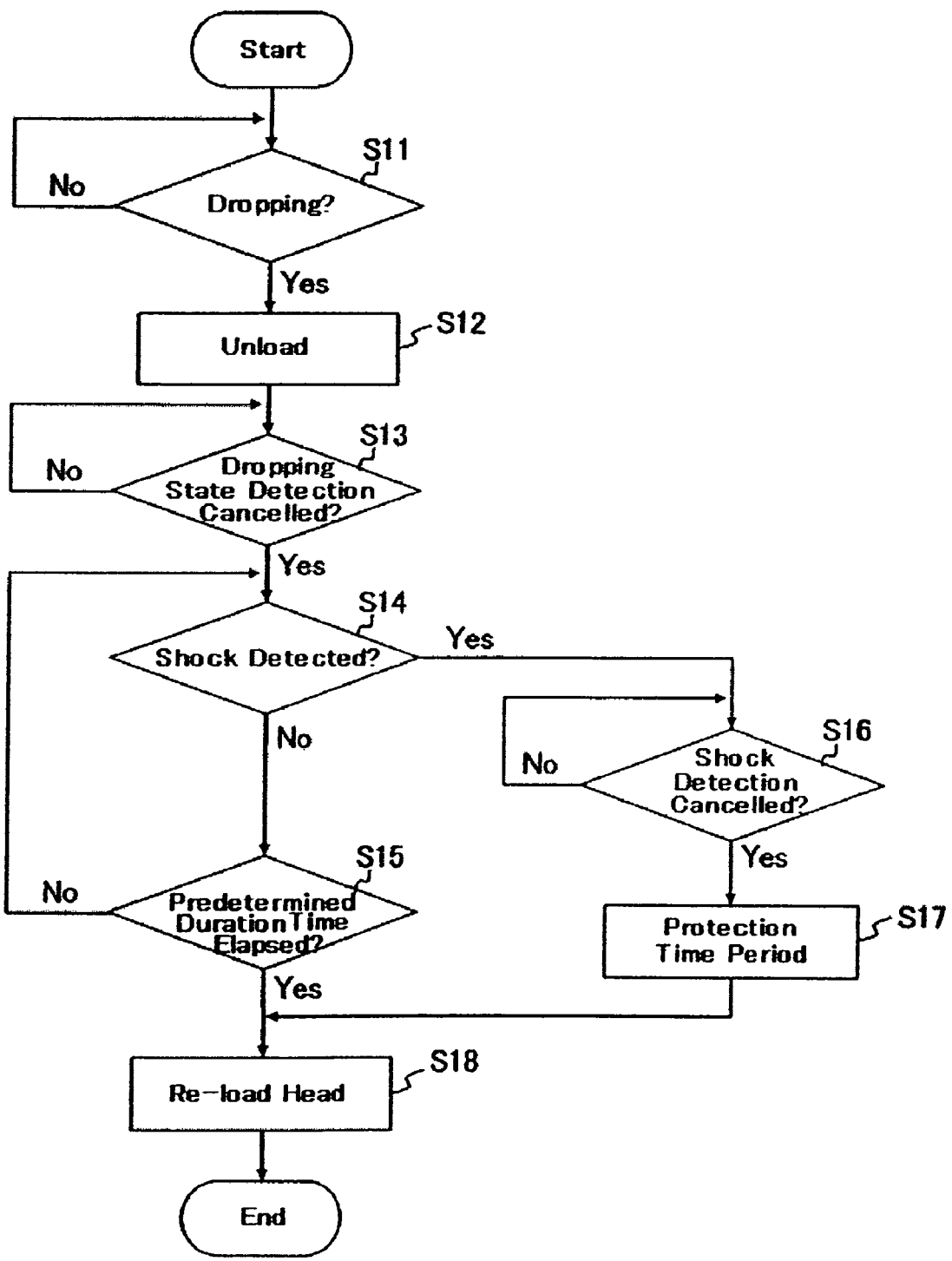
FIG. 4 is an exemplary flowchart of a head retraction and re-load process according to the present invention.

The following provides a description of a process in which the unloaded head 12 is returned to a state where the head 12 may be re-loaded in the case where it is judged that the magnetic disk drive 1 is in a dropping state. FIG. 4 is a flowchart showing flows of the process which is performed until the head 12 is unloaded after a dropping state is detected and the head 12 is re-loaded. In step S11, the HDC/MPU 22 judges whether the magnetic disk drive 1 is in a dropping state by using the output signal of the acceleration sensor 28. If it is judged that the magnetic disk drive 1 is in a dropping state, the HDC/MPU 22 executes the unload operation according to the aforementioned procedure in step S12.

In step S13, the HDC/MPU 22 judges whether the dropping state detection is cancelled, that is, whether the magnetic disk drive 1 is no longer dropping, by using the output signal of the acceleration sensor 28. This judgment may be based on whether any of the magnitudes of three directional accelerations detected by the acceleration sensor 28 becomes larger than a drop detection threshold (for example, 0.4 G).

If cancellation of the dropping state is detected, the HDC/MPU 22 executes steps S14 and S15 where it is judged whether a landing shock is detected by the shock sensor 26 within a predetermined amount of time (corresponding to standby time T2 in FIG. 5(*a*) described later) after the dropping state detection was cancelled. If no shock is detected within the predetermined amount of time after the dropping state detection was cancelled, it is judged that the magnetic disk drive 1 was incorrectly judged to be in a dropping state in step S11. In this case, the head 12 immediately becomes ready to be re-loaded (step S18). If a shock is detected by the shock sensor 26 within the predetermined amount of time after the dropping state detection was cancelled, it is judged that a landing shock has occurred. In this case, the head 12 becomes ready to be re-loaded after a predetermined amount of protection time (corresponding to protection time Tg in FIG. 5(*b*) described later) after the shock detection is cancelled (steps S16, S17 and S18).

The process shown in FIG. 4 may be realized by executing firmware programs stored in the ROM 24 through the HDC/MPU 22 and controlling the R/W channel 21, the motor driver 25, the shock sensor 26, the acceleration sensor 28 and the like, as well as processing performed by the HDC/MPU 22.

Figure 5:
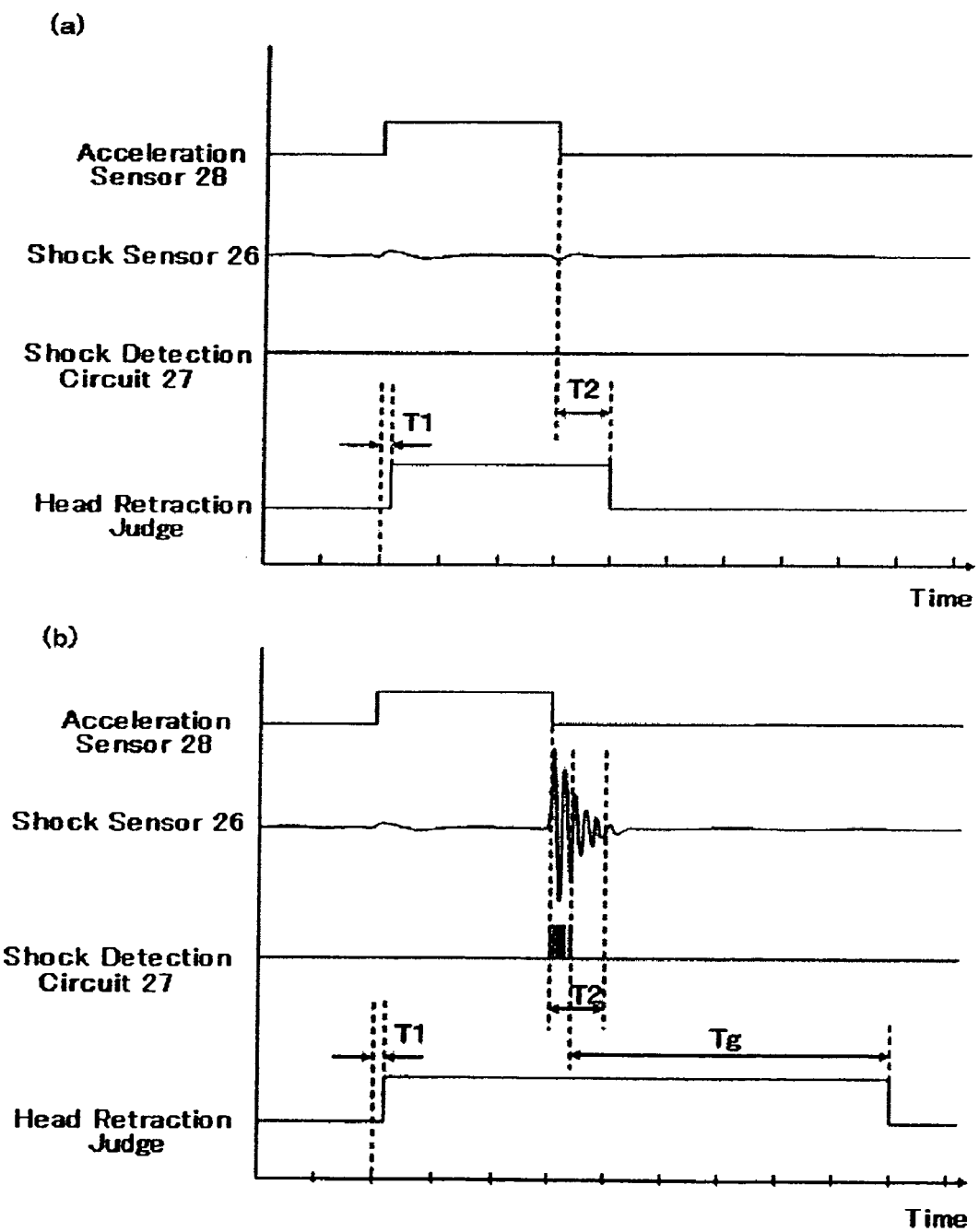
FIG. 5 exemplary shows the head retraction and re-load timings.

FIG. 5(*a*) and FIG. 5(*b*) are timing charts showing from when the head 12 is retracted (unloaded) to when the head is re-loaded. FIG. 5(*a*) shows the case where no shock is detected, and FIG. 5(*b*) shows the case where a shock is detected. The High level of the rectangular wave from the acceleration sensor 28 indicates that a drop is detected by the acceleration sensor 28. The Low level of the rectangular wave from the acceleration sensor 28 indicates that no drop is detected by the acceleration sensor 28. The output waveform of the shock sensor 26 indicates the shock (acceleration) detected by the shock sensor 26. The High level of the rectangular wave from the shock detection circuit 27 indicates that the magnitude of the shock detected by the shock detection circuit 27 is equal to or larger than a predetermined threshold. Likewise, the Low level indicates that the magnitude of the shock detected by the shock detection circuit 27 is equal to or smaller than the predetermined threshold. The High level of the rectangular wave from "Head Retraction Judge" in the figure indicates that the HDC/MPU 22 has judged that the head 12 should be unloaded. On the other hand, the Low level of the rectangular wave from "Head Retraction Judge" indicates that loading of the head 12 is permitted by the HDC/MPU 22.

T1 shown in FIG. 5(*a*) and FIG. 5(*b*) is a processing period of time from when the acceleration sensor 28 detects a drop state to when the HDC/MPU 22 judges that the magnetic disk drive 1 is in a dropping state. T2 shown in FIG. 5(*a*) and FIG. 5(*b*) is a waiting time period from when the drop detection is cancelled to when the head 12 is re-loaded in the case where it is judged that no shock occurs after the HDC/MPU 22 detects the cancellation of the drop state. The waiting time period T2 may be defined by the time when the dropping state detection is judged to have been cancelled and the time around this time. The protection time period Tg in FIG. 5(*b*) defines when re-loading of the head 12 is to be done if it is judged that a shock is occurring by the HDC/MPU 22. In FIG. 5(*b*), the protection time period Tg is started at the point of time when the last shock detection is cancelled during the waiting time period T2 (at the last falling edge of the output of the shock detection circuit 27 during the waiting time period T2). The length of the protection time period Tg may be determined according to the maximum bouncing height assumed. For example, the protection time period Tg which lasts for about 560 ms may be set if 40 cm is assumed as the maximum height. The protection time period Tg may also be defined such that it starts upon detection of a drop by the acceleration sensor 28 or retraction of the head.

If it is judged that the magnetic disk drive 1 is in a dropping state by the HDC/MPU 22 due to a rise of the output of the acceleration sensor 28 during the waiting time period T2 in FIG. 5(*a*) or FIG. 5(*b*), or during the protection time period Tg in FIG. 5(*b*), the head retraction sequence is again performed according to the flow chart shown in FIG. 4.

As mentioned above, in the case where the start point of the protection time period Tg is at the point of time when the last shock detection is cancelled during the waiting time period T2, that is, at the point of time when the shock judgment is cancelled since an amplitude of the acceleration detected by the shock sensor 26 falls below a predetermined magnitude, even if a series of shocks continuously act due to bounces after the drop, etc., the start point of the protection time period Tg may be flexibly set to the point of time when the magnitude of a series of shocks falls to a low level.

Further, in FIG. 5(*b*), if a shock is detected due to a rise of the output signal of the shock detection circuit 27 sometime between the end of the waiting time period T2 and the end of the protection time period Tg in FIG. 5(*b*), the protection time period Tg may be reset so that the Tg starts at the time when the shock detection is cancelled in order to prohibit the loading until the end of the protection time period Tg. Depending on the movement of the magnetic disk drive 1 after it dropped, a shock may be detected by the shock sensor 26 and the shock detection circuit 27 without a drop detection due to a change in the output of the acceleration sensor 28. If the protection time period Tg is reset as mentioned above, it is possible to protect the magnetic disk drive 1 from shocks due to such unusual movement.

The protection time period Tg may be defined such that it starts at the point of time when the last shock is detected during the waiting time period T2, that is, at the last rising edge of the output of the shock detection circuit 27 during the waiting time period T2. Alternatively, it may be started at the point of time when a drop is detected by the acceleration sensor 28 or when the head is retracted, that is, when processing time T1 has passed.

As shown in FIG. 5(*a*), for the magnetic disk drive 1 according to the embodiment, if the shock sensor detects no shock after the magnetic disk drive 1 is judged to be no longer in a dropping state by the output from the acceleration sensor 28, the head 12 is immediately re-loaded. This enables the head 12 to be immediately re-loaded by recognizing that the magnetic disk drive 1 was incorrectly judged to be dropping. Thus, it is possible to reduce the amount of time for which access to the magnetic disk is inhibited due to the retracted head. Accordingly, the magnetic disk drive 1 may be improved in access performance.

Figure 6:
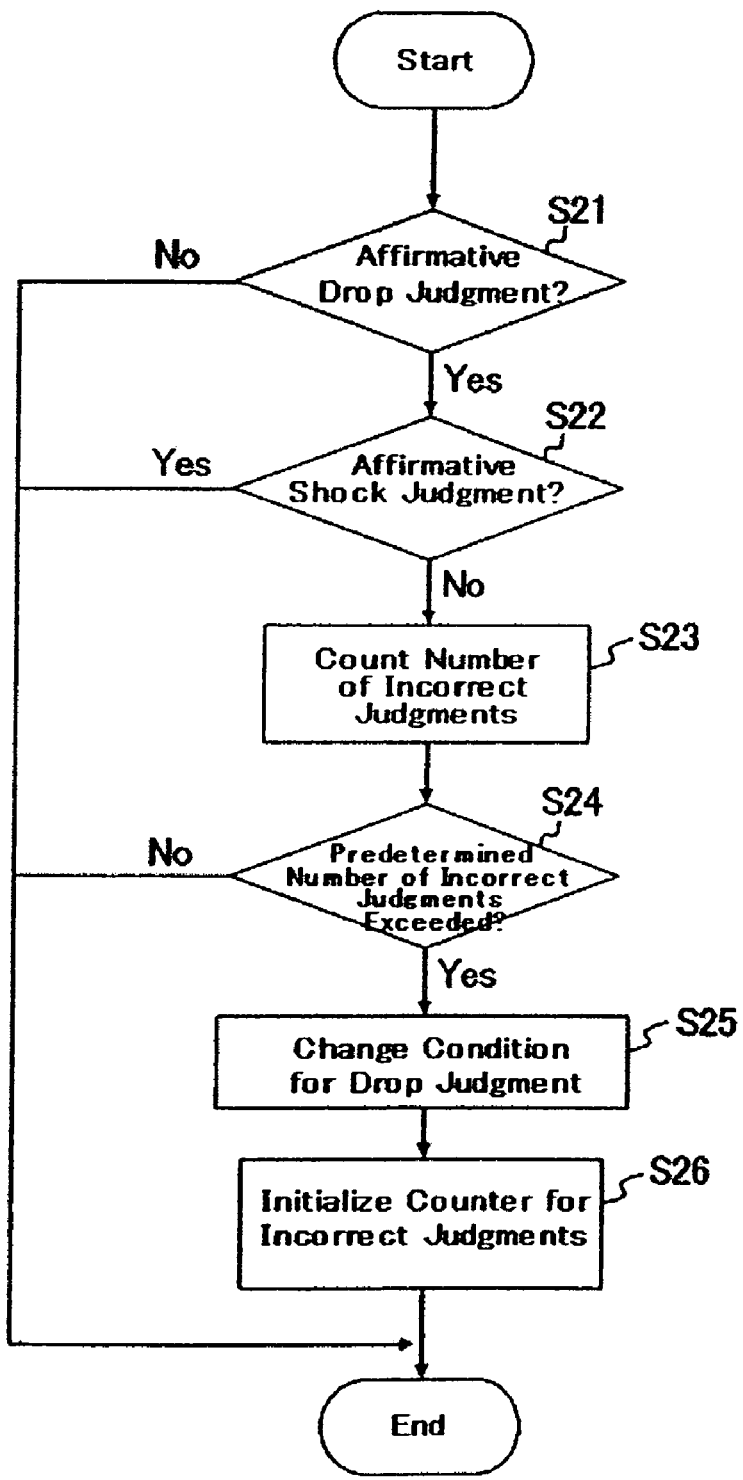
FIG. 6 is an exemplary flowchart of processes for changing drop judgment condition according to the present invention.

The following provides a description of the process for changing the judgment condition for judging whether the magnetic disk drive 1 is in a dropping state based on the output signal of the acceleration sensor 28. FIG. 6 is a flowchart showing the process in which the HDC/MPU 22 changes the judgment condition judging whether the magnetic disk drive 1 is in a dropping state. In step S21, the HDC/MPU 22 uses the output signal of the acceleration sensor 28 to judge whether the magnetic disk drive 1 is in a dropping state. If the magnetic disk drive 1 is judged to be in a dropping state, the unload process of the head 12 is executed according to the aforementioned procedure. In step S22, it is judged whether a shock is detected by the shock sensor 26 after the affirmative drop judgment. If a shock is detected by the shock sensor 26, the process is terminated. On the other hand, if no shock is detected by the shock sensor 26, the HDC/MPU 22 recognizes that the judgment is incorrect and counts the number of incorrect judgments in step S23. The RAM 23 or an internal register of the HDC/MPU 22 may be used to form a counter to hold the number of incorrect judgments.

Then, it is judged in step S24 whether the number of incorrect judgments is larger than a predetermined number. If not, the process is terminated. On the other hand, if the number of incorrect judgments is larger than the predetermined number, the condition for judging the magnetic disk drive 1 to be in a dropping state are changed so that it is more stringent for judgment in which it is in a dropping state in step S25. In step S26, the count number of incorrect judgments is initialized and then the process is terminated.

The process shown in FIG. 6 may be realized by executing firmware programs stored in the ROM 24 through the HDC/MPU 22 and controlling the R/W channel 21, the motor driver 25, the shock sensor 26, the acceleration sensor 28 and the like, as well as processing performed by the HDC/MPU 22.

The following provides specific examples of making the drop judgment condition more stringent. First, it is preferable that the time between the moment when a drop starts to be detected by the acceleration sensor 28 and the moment when the HDC/MPU 22 judges whether the magnetic disk drive 1 is in a dropping state be made longer. Specifically, for example, a threshold relative to the continuous time of a drop detection signal output from the acceleration sensor 28 is changed from 50 ms to 70 ms. With this setting, the judgment is correctly performed, resulting in reduction of the incorrect judgments. It is therefore possible to improve the magnetic disk drive 1 in access performance and availability since unnecessary retractions of the head 12 may be reduced by decreasing incorrect judgments.

To make the drop judgment more stringent, the gravity state detection may be more stringent by changing the threshold of the gravity state detection when the acceleration sensor 28 detects a drop state. For example, the absolute value of the acceleration is changed from 0.4 G to 0.2 G. In addition, if a low-pass filter is provided between the acceleration sensor 28 and the HDC/MPU 22 in order to remove noises from the output signal of the acceleration sensor 28, this filter may be disabled, or the passband may be increased for the higher frequencies. Also, changing the condition described above may improve the magnetic disk drive 1 in access performance and availability since they may reduce incorrect drop judgments resulting in reduction of the unnecessary retraction time of the head 12.

Other Embodiments

The acceleration sensor 28 may be disposed outside the magnetic disk drive, for example, inside the outer frame of an electronic apparatus having a magnetic disk drive installed therein. In this case, drop judgment using the output signal of the acceleration sensor 28 may be performed by a circuit installed outside the magnetic disk drive. Further, the circuit may output a command that instructs the head to be unloaded to the magnetic disk drive so that an unload operation of the head may be performed.

In the magnetic disk drive 1 according to the first embodiment of the present invention, the unload head process described with reference to FIG. 3, the prompt head re-load process in case of an incorrect drop judgment described with reference to FIGS. 4 and 5, and the process to change the drop judgment condition described with reference to FIG. 6 are all performed. However, it is not always necessary to perform all of these processes above. The magnetic disk drive may be configured so as to perform one or two of these processes.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
   a magnetic disk;
   a head which accesses the magnetic disk;
   a sensor section configured to detect an acceleration;
   a first judgment section which judges whether a drop is occurring based on an output of the sensor section;
   a processing section which executes a retraction of the head if the first judgment section judges that a drop is occurring; and
   a second judgment section which detects the occurrence of a shock based on the output of the sensor section;
   wherein, after the first judgment section judges that a drop is occurring, the processing section detects whether the drop judgment is incorrect according to whether the occurrence of a shock is detected by the second judgment section and changes the drop judgment condition of the first judgment section based on a history of detected incorrect drop judgments, wherein:
   the sensor section includes a gravity sensor which generates a detection signal by detecting a zero gravity state, and a shock sensor which detects a change in acceleration due to a landing shock;
   the first judgment section judges whether a drop is occurring based on the detection signal of the gravity sensor; and
   the second judgment section judges whether a shock is occurring based on the detection signal of the shock sensor.

2. A magnetic disk drive according to claim 1, wherein if the number of incorrect drop judgments exceeds a predetermined number, the processing section changes the judgment condition of the first judgment section so as to more stringently make a drop judgment.

3. A magnetic disk drive according to claim 1, wherein the judgment condition is changed by shifting the timing at which a drop judgment is made after a change in the output signal of the sensor section is detected by the first judgment section.

4. A magnetic disk drive according to claim 1, wherein:
the first judgment section makes a drop judgment by comparing a threshold with the acceleration detected by the sensor section; and
the judgment condition is changed by modifying the threshold.

5. A magnetic disk drive according to claim 1, further comprising a low-pass filter between the sensor section and the first judgment section; wherein if the number of incorrect drop judgments exceeds a predetermined number, the low-pass filter is disabled or a passband of the low-pass filter is increased for higher frequencies.

6. A magnetic disk drive comprising:
a magnetic disk;
a head which accesses the magnetic disk;
a sensor section configured to detect an acceleration;
a first judgment section which judges whether a drop is occurring based on the output of the sensor section;
a processing section which executes a retraction of the head if the first judgment section judges that a drop is occurring; and
a second judgment section which detects the occurrence of a shock based on the output of the sensor section;
wherein the processing section performs re-loading of the head if the affirmative drop judgment made by the first judgment section is cancelled after the head begins to be retracted, and if no shock is detected by the second judgment section after the affirmative drop judgment is cancelled, wherein the processing section performs re-loading of the head when a first predetermined amount of time has passed with no shock detected by the second judgment after the affirmative drop judgment is cancelled by the first judgment section.

7. A magnetic disk drive according to claim 6, wherein if a shock is detected by the second judgment section after the head begins to be retracted, the processing section performs re-loading of the head when a second predetermined amount of time has passed.

8. A magnetic disk drive according to claim 7, wherein the first predetermined amount of time is shorter than the second predetermined amount of time.

9. A magnetic disk drive according to claim 6, wherein if the affirmative drop judgment made by the first judgment section is cancelled after the head begins to be retracted, the processing section performs re-loading of the head if no shock is detected by the second judgment section within a predetermined period of time including the point of time when the affirmative drop judgment is cancelled.

10. A magnetic disk drive according to claim 6, wherein if a shock is detected by the second judgment section after the head begins to be retracted, the processing section performs re-loading of the head when a second predetermined amount of time has passed after the shock detection detected by the second judgment section is cancelled.

11. A magnetic disk drive according to claim 10, wherein if a new shock is detected by the second judgment section before the second predetermined amount of time elapses, the processing section performs re-loading of the head when the second predetermined amount time has passed after the new shock detection detected by the second judgment section is cancelled.

12. A magnetic disk drive according to claim 6, wherein in the case where a shock is detected by the second judgment section and the shock detection is cancelled, and the case where the affirmative drop judgment is cancelled without a shock detected by the second judgment section, the time from the cancellation to the re-loading of the head is capable of being varied depending on the cases.

13. A magnetic disk drive comprising:
a magnetic disk;
a head which accesses the magnetic disk;
a sensor section configured to detect an acceleration; and
a processing section which judges whether a drop is occurring based on the output of the sensor section and executes a retraction of the head if the processing section judges that the drop is occurring;
wherein, the processing section executes the retraction of the head in such a manner that at least until the head reaches the periphery of the magnetic disk, the head position continues to be detected based on servo data recorded on the magnetic disk and a head seek speed continues to be controlled by using the detected head position, wherein:
an actuator for moving the head is provided; and
the processing section drives the actuator so that the head is retracted at a constant speed when the head is retracted from the periphery of the magnetic disk to a head retraction place.

14. A magnetic disk drive according to claim 13, wherein the processing section continues to control the head seek speed based on the servo data during the retraction of the head until the head reaches a non-data area on the magnetic disk.

15. A magnetic disk drive according to claim 13, wherein:
the actuator is provided with a voice coil motor which generates a driving force to move the head; and
the processing section drives the actuator so that the back electromotive force of the voice coil motor falls within a predetermined range when the head is retracted from the periphery of the magnetic disk to the head retraction place.

16. A magnetic disk drive according to claim 13, wherein:
an actuator for moving the head is provided; and the processing section retracts the head from the periphery of the magnetic disk to the head retraction place by supplying a predetermined level of a drive voltage or a drive current to the actuator.

* * * * *